J. L. SCHOEN.
PISTON RING.
APPLICATION FILED DEC. 11, 1920.
1,406,763. Patented Feb. 14, 1922.
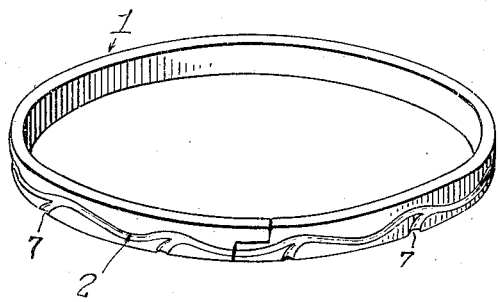
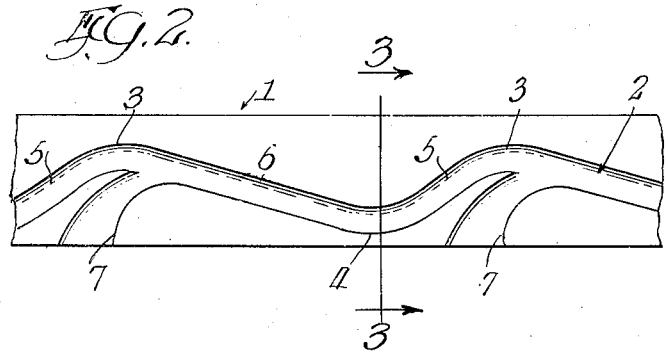
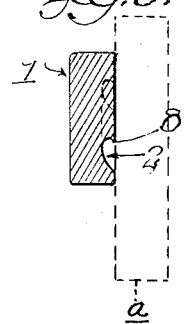
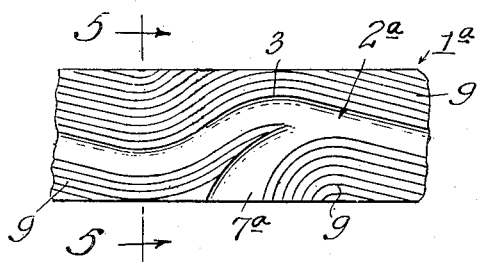
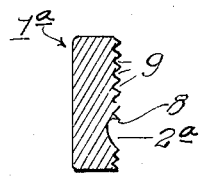
Inventor
John L. Schoen
by Eugene Cowan, Atty.

UNITED STATES PATENT OFFICE.

JOHN L. SCHOEN, OF CHICAGO, ILLINOIS.

PISTON RING.

1,406,763.  Specification of Letters Patent.  Patented Feb. 14, 1922.

Application filed December 11, 1920. Serial No. 429,844.

*To all whom it may concern:*

Be it known that I, JOHN L. SCHOEN, a citizen of the United States, residing at Chicago, in the county of Cook and State of Illinois, have invented new and useful Improvements in Piston Rings, of which the following is a specification.

This invention relates to improvement in piston rings particularly adapted for pistons of internal combustion engines, such as are employed on automobiles, motor trucks, and the like.

Among the objects of my invention is to provide the ring about the outer face thereof with means to cause a flow of oil circumferentially about the ring between the same and the cylinder wall in the reciprocation of the piston in the cylinder, and thus produce an effective oil seal completely around the piston.

The invention consists further in the matters hereinafter described and more particularly pointed out in the appended claims.

In the accompanying drawings—

Fig. 1 is a perspective view of a piston ring embodying the features of my invention.

Fig. 2 is an enlarged fragmentary front elevational view of said ring;

Fig. 3 is a transverse sectional view taken on line 3—3 of Fig. 2;

Fig. 4 is an enlarged fragmentary front elevational view of the ring, showing other features of my invention applied thereto; and Fig. 5 is a transverse sectional view taken on line 5—5 of Fig. 4.

In the drawings, I have shown the piston ring 1 of the split type with a step-shaped joint at the split ends.

In the front face of the ring I provide an oil groove 2 extending circumferentially around the ring and across the split ends of the ring at the joint, as shown in Fig. 1. The groove is made undulating or wavelike; that is, at the points 3 the groove is nearer the upper edge of the ring than at the points 4, which approach close to the lower edge of the ring. In the stretch between each two adjacent points 3 there is a point 4, and that is nearer one point 3 than the other. This divides the stretch into two joined portions 5 and 6, the former shorter than the latter and arranged at a sharper angle, as shown. This causes the oil to travel down the relatively long inclined portion 6 before entering the shorter inclined portion 5.

Under each high point is a branch duct 7 opening at its upper end into the groove 2 at the beginning of the associated inclined portion 6. The other end of each duct is flared or widened and opens downward through the lower edge of the ring, so that oil below the lower edge of the ring has a ready means of entrance into the groove 2 on each downward stroke of the piston, and also to allow the oil to be readily drawn out of the groove onto the cylinder wall on each upward stroke of the piston. The branch ducts 7 are preferably all inclined upward in the same direction and at the same angle and open into the associated groove portion 6 slightly in advance of the high point 3 and in the same general direction of the flow of oil through the groove 2. By this arrangement the oil entering the ducts 7 on the downward stroke of the piston flows into the groove 2 in such manner as to create a flow of the oil completely about the ring, the incoming oil creating a flow in the sharper inclined portions 5.

This arrangement of the groove 2 thus provides means about the front face of the ring to cause a flow of oil circumferentially about the ring between the same and the cylinder wall, which is indicated by the dotted line *a* in Fig. 3. The oil being progressed or caused to flow circumferentially about the ring and between the same and the cylinder wall, thus insures the gaining of an effective and continuous oil seal between the ring and the cylinder wall.

In Fig. 3, I have shown the ring 1 in cross-section, and it will be noted that the groove is undercut in the top wall to provide a relatively sharp upper front edge 8 to scrape the oil from the cylinder wall as the piston descends. This undercutting of the groove also allows the oil to find a ready means of escape from the sharp edge 8 to avoid flooding it.

In Figs. 4 and 5, I have shown a ring $1^a$, provided with an undulating oil groove $2^a$ having ducts $7^a$, as before. In addition, this ring has in the front face thereof a plurality of relatively shallow grooves 9 extending about the front face of the ring and being on opposite sides of the main oil groove $2^a$. These shallow grooves 9 have the same general shape as the main groove $2^a$ and occupy the full front face of the ring and thus serve as additional means for collecting oil in the reciprocation of the piston and cause circulation of the oil circumferentially about the ring between it and the cylinder wall.

While I have shown and described herein in detail the main oil groove arranged and having the particular shape shown, yet it is to be of course understood that it is within the scope of my invention to give the groove any other form desired as long as it accomplishes the objects of my invention.

I claim as my invention:

1. A piston ring provided with means about the front face thereof to cause a flow of oil circumferentially about the ring between the same and the cylinder wall in one direction only.

2. A piston ring having in the front face thereof an oil groove formed to cause a flow of oil circumferentially about the ring in one direction only.

3. A piston ring having in the front face thereof an undulating oil groove formed to collect oil from a cylinder wall and extending circumferentially about the ring to cause a flow of oil circumferentially about the same in one direction only.

4. A piston ring having in the front face thereof an undulating oil groove extending circumferentially about the ring and provided with a plurality of branch ducts spaced about the ring and arranged at an inclination to the general direction of the flow of oil through the groove, said ducts opening at their inner ends into said groove and at their outer ends through one edge of said ring.

5. A piston ring having in the front face thereof an undulating oil groove extending circumferentially about the ring, and provided with a plurality of branch ducts spaced about the ring and arranged at an inclination to the general direction of flow of the oil through the groove, said ducts having widened outer ends opening through one edge of the ring.

6. A piston ring having in the front face thereof a wave-like oil groove extending circumferentially about the ring, and provided with a plurality of high and low points joined by inclined portions of the groove, branch ducts in the front face of the ring and opening at their inner ends into said groove, one duct at each high point and arranged to discharge into the groove in the general direction of flow of the oil therethrough, said ducts opening at their outer ends through the edge of the ring.

7. A piston ring having in the front face thereof and between the upper and lower edges of the ring an undulating oil groove extending circumferentially about the ring, branch ducts spaced about in the front face of the ring and each opening at one end into the groove and at the opposite end through one of the edges of the ring, and a plurality of relatively shallow grooves in the front face of the ring on at least one side of the main groove and having the same general shape as the latter.

In testimony that I claim the foregoing as my invention, I affix my signature, this 27th day of October, A. D. 1920.

JOHN L. SCHOEN.